Jan. 16, 1934.  R. J. NORTON  1,943,836
BRAKE OPERATOR
Original Filed May 28, 1930
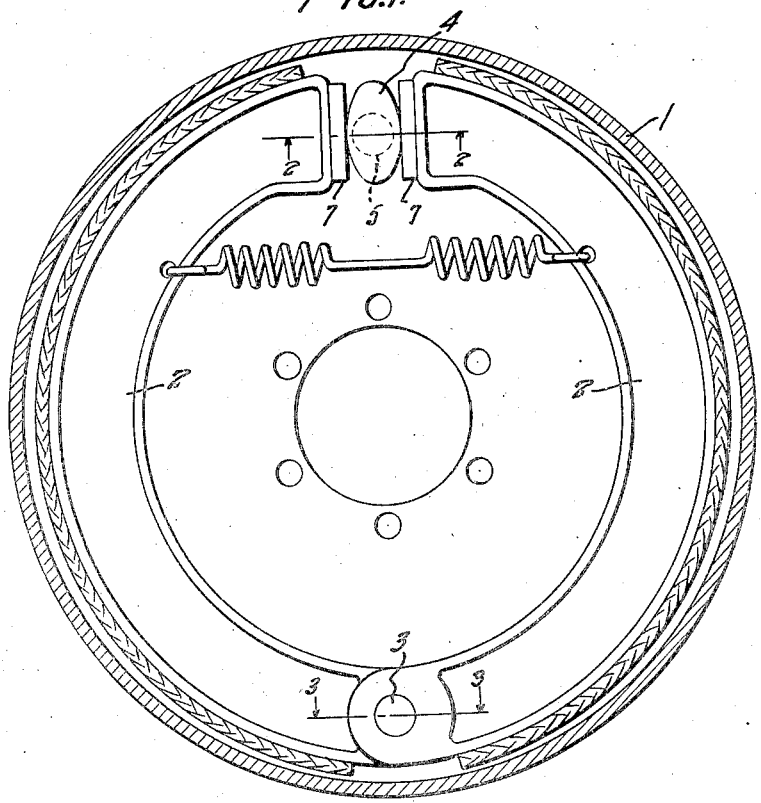
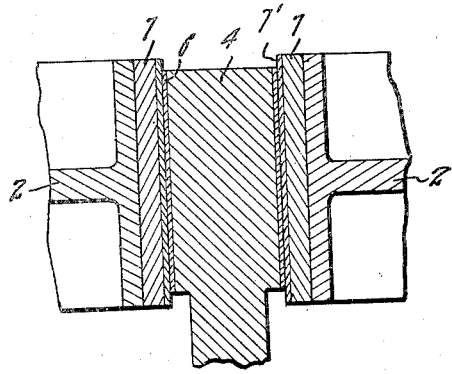
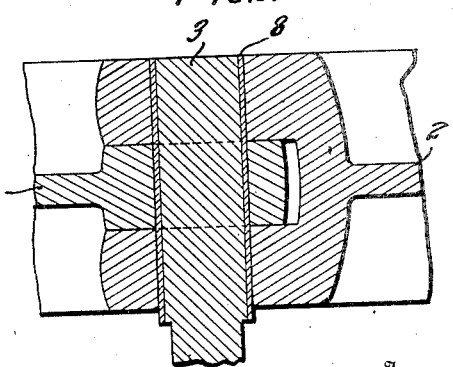
Inventor
RAYMOND J. NORTON
By Semmes & Semmes
and M. W. McConkey
Attorneys Patented Jan. 16, 1934

1,943,836

UNITED STATES PATENT OFFICE 1,943,836

BRAKE OPERATOR

Raymond J. Norton, Washington, D. C., assignor to Bendix Brake Company, South Bend, Ind., a corporation of Illinois Original application May 28, 1930, Serial No. 456,665. Divided and this application January 22, 1931. Serial No. 510,519

1 Claim. (Cl. 188—78)

This invention relates to brake mechanisms and more particularly to an improved brake operator.

A typical form of brake comprises two or more shoes which are expanded, under the action of a cam, into engagement with a rotating drum. Due to the constant operation, the respectively abutting surfaces on the cam and shoe and anchor pin and shoe are subjected to considerable wear. In order to prolong the life of the brake mechanism it is customary to provide wear plates, usually of hardened steel, on the end of the shoe.

It is an object of the present invention to provide an improved brake anchor pin.

Yet another object is to provide a brake operator characterized by smoothness of operation.

A further object is to facilitate the operation of relatively pivotal and relatively movable elements in brake structures.

With these and other equally important objects in view, the invention includes a brake structure, preferably of the internal expanding type in which the spreading means comprises a cam and in which there is interposed between the cam and the shoe a metallic member characterized by a high degree of hardness, that is to say wear resistance, and a low coefficient of friction. The invention further includes the provision for the interposition of similar material between the anchor pin and the contiguous portion of the shoe.

In order to clarify an understanding of the invention a preferred modification is shown in the accompanying drawing, in which:

Figure 1 is a side elevation of an internal expanding brake;

Figure 2 is an enlarged section taken on line 2—2 of Figure 1 and;

Figure 3 is a similar section taken on line 3—3 of Figure 1.

Due to the refinements in the manufacture of brakes, the brake assemblages now employed are characterized by a desirably small clearance of the rotatable and non-rotatable members. For this reason the question of wear between the cam and the shoe becomes of importance.

A desideratum in brake mechanisms is smoothness of operation. This has been sought to be attained by a number of expedients, each of which contributes in its own part to providing the final efficient structure.

An important purpose of the present invention is to generally improve these two factors, i. e. smoothness of operation and maintained small clearance. This may be done as indicated above by interposing between the cam and the shoe, and also by interposing between the anchor pin and the shoe, a material which is wear resistant and which is as frictionless as possible. Now this may be simply and readily accomplished by plating one or both of the respectively abutting and movable parts. For example, that face of the cam wear plate which abuts the cam may comprise an electro deposited coat of chromium. Similarly, the wear face of the cam may be chromium plated; likewise the shank of the anchor pin or the contiguous surface of the shoe bushing, or both, may be plated with this material.

Chromium is chosen because it is characterized in a very high degree by wear resistance and a smooth surface of low coefficient of friction. Obviously in lieu of this particular metal other depositable metals having these characteristics may be employed. Likewise it will be appreciated that it is within the scope of this invention to plate the chromium upon a separate element. As a specific example of this type of structure a brake assemblage may be made up in which a chromium plated sleeve is interposed between the anchor pin and the bushing of the shoe. Similarly the cam may be enclosed by a detachable chromium plated member.

As shown in the drawing, the invention may be embodied in a brake mechanism comprising a drum 1 within which are mounted two or more brake shoes 2. These brake shoes are supported for pivotal movement by means of an anchor pin 3 and are spread apart in the engagement with the drum under the action of the cam 4. As is known, the anchor pin and cam are mounted in apertures in the backing plate 5.

In accordance with the present invention the cam member may be plated, by electrodeposition, with a fine grained adherent coat of chromium indicated at 6. If desired not only the working surfaces of the cam but also the cam shaft may be chromium plated. Chromium plating of the shaft reduces the friction between the shaft and its cooperate bearing. In lieu of directly plating upon the cam this member may be enclosed within a chromium plated cover or sleeve which may be detachably secured to the cam in any desired manner.

Similarly, as indicated hereinbefore, the cam abutting ends of the shoe are provided with wear plates which have a surface characterized by a low coefficient of friction and high wear resistance. As shown, particularly in Figure 1, the ends of the shoe are provided with the cam wear plates 7, the exterior surface of which is plated at 7' with chromium or another metal having similar characteristics. By chromium plating both the cam and the cam wear plate the friction between these two relatively movable members is greatly diminished and longevity of these parts insured. Obviously, however, these beneficial results may be secured to a smaller degree by providing a plated metal on only one of the parts.

If desired, the advantages of the invention may also be secured by utilizing special materials for the cam wear plate. For example, these members may be made up of a permanently lubricated resin in the manner disclosed in the copending application Serial No. 324,361, filed December 7, 1928. This may readily be done by impregnating suitable fabric with a solid or liquid lubricant, then impregnating with a fusible form of a synthetic resin and finally treating the impregnated material under suitable conditions of temperature and pressure to transform the fusible resin over to the infusible form. An advantage of this structure resides in the fact that a metal to non-metal contact is secured and, due to the low coefficient of friction of the cam and the permanent lubrication of the cam wear plate, a smooth and easy operation is achieved.

The operation of this type of brake may also be improved, as noted above, by interposing a metal having a low coefficient of friction in the pivotal connection. One method of accomplishing this is to chromium plate the shank of the anchor pin so as to provide a low friction surface 8 for coaction with the contiguous portions of the shoe. Manifestly the same result may be accomplished by utilizing a chromium plated sleeve attached either to the bush section of the shoe or to the shank of the anchor pin. This is shown on the drawing as element 8 when this element is considered as detached from the pin 3 and comprising a separate plated sleeve.

With such a structure the relatively movable members of the brake mechanism operate with ease and smoothness and minimal wear. Due to the high wearing qualities and the initial small clearance of the brake, members may be maintained over a long period of time.

It will be appreciated that the improvements herein described are applicable to a brake mechanism having any number of shoes. Likewise it is to be understood that the metal chromium is described as a metal which presents the desirable characteristics of low friction and resistance to wear. Other metals which possess either one or both of these qualities may be employed.

Therefore, while a preferred embodiment of the invention is shown and described, it is to be understood that this is merely exemplary of the concept herein involved and typifies any equivalent structure by which the improved results outlined may be secured.

This application is a division of prior application Serial No. 456,665, filed May 28, 1930.

I claim:

A brake pivot pin having a chromium plated sleeve.

RAYMOND J. NORTON.